June 1, 1943. R. H. HILL 2,320,867
REMOTE AUTOMATIC RADIO CONTROL
Original Filed June 28, 1938 3 Sheets-Sheet 1

Inventor
Robert H. Hill
By Blackmore, Spencer & Flint
Attorneys

June 1, 1943.   R. H. HILL   2,320,867

REMOTE AUTOMATIC RADIO CONTROL

Original Filed June 28, 1938   3 Sheets-Sheet 2

Inventor
Robert H. Hill
By Blackmore, Spencer & Flick
Attorneys

Patented June 1, 1943

2,320,867

UNITED STATES PATENT OFFICE 2,320,867

REMOTE AUTOMATIC RADIO CONTROL

Robert H. Hill, Anderson, Ind., assignor to General Motors Corporation, Detroit, Mich., a corporation of Delaware Original application June 28, 1938, Serial No. 216,301. Divided and this application December 19, 1940, Serial No. 370,849

7 Claims. (Cl. 192—142)

This invention relates to control mechanism and more specifically to index control mechanism wherein it is desired to stop a given rotatable shaft at predetermined set angular positions, and is a division of S. N. 216,301, filed June 28, 1938, in the name of Robert H. Hill and entitled "Remote automatic radio control."

There are, of course, many instances and applications in which it is desired to provide index control for rotatable means where a plurality of set angular index positions are desired and as one example there might be mentioned radio receiving sets in which it is desired to automatically tune the set to different angular positions which will provide reception of various transmitting stations. The device is, however, of broader application and this is only mentioned as an example of one manner in which the same might be applied.

There are also instances in which it is not feasible to mount the receiver or other device to be indexed at a position which will be accessible to the operator. This is particularly true in the case of a radio receiver mounted in a mobile vehicle where it may be necessary for purposes of strength or space to mount the receiver per se at some distance from the control means.

It is therefore an object of my invention to provide means for indexing a rotatable shaft to different predetermined angular positions.

It is a further object of my invention to provide automatic means for indexing such a shaft as described by the mere closure of a predetermined circuit.

It is a further object of my invention to provide automatic indexing means for a shaft operated from a remote distance.

It is a still further object of my invention to provide an automatic tuning means for indexing a shaft wherein it is merely necessary to operate a switch to close the circuit and the device will then continue through to its predetermined indexing position.

With these and other objects in view, the embodiments of my invention will be best understood by reference to the following specification and claims and the illustrations in the accompanying drawings, in which:

Figure 1:
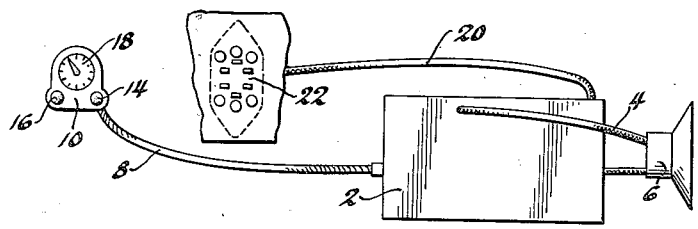
Figure 1 shows a diagrammatic construction of a radio receiver having my indexing mechanism connected thereto.
Figure 2:
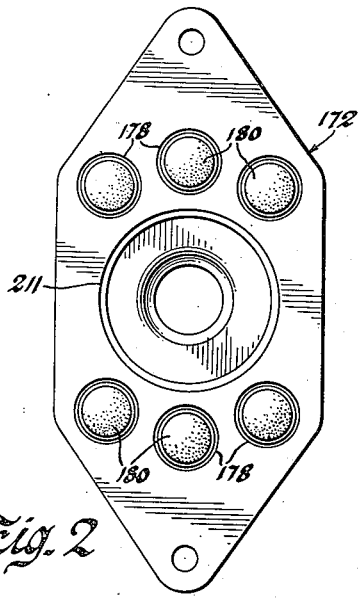
Figure 2 is an enlarged face view of a control panel for the same.
Figure 3:
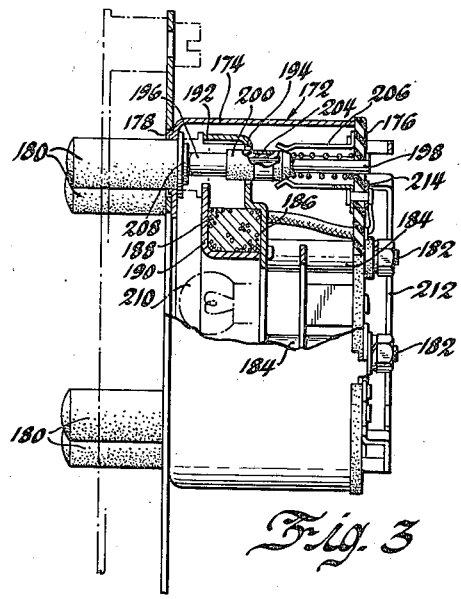
Figure 3 is a side elevation of the panel shown in Figure 2, parts being broken away and shown in section.
Figure 4:
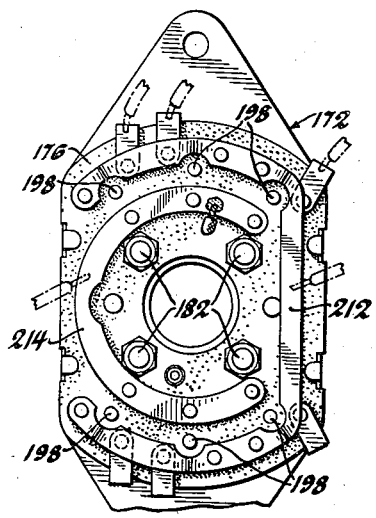
Figure 4 is a rear view of the panel.

Referring now more specifically to the drawings, there is illustrated in Figure 1 a radio receiver 2 which houses the receiving set and also mechanism for tuning or indexing the tuning shaft thereof. Connected thereto by suitable cables 4 is a loud speaker 6 for emanating the audible waves. Also connected thereto is a hollow cable 8 within which is a rotatable shaft for mechanically driving the tuning shaft and connected to the outer end of the cable 8 is a conventional control head 10 having a tuning knob 14 and a volume control knob 16 as well as the indexing dial 18 which rotates in correspondence with the tuning means in the set to show what station, or rather, what frequency is being received. Also connected to the casing is a multiple wire cable 20 which is connected at its outer or remote end to a panel 22 containing a plurality of switches. It is, of course, obvious that these two panels 10 and 22 may be combined into a combination control panel.

Figure 5:
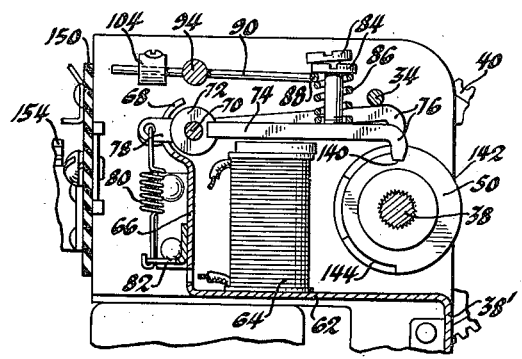
Figure 5 is a vertical section through the camshaft and its associated controls taken on line 5—5 of Figure 7.
Figure 7:
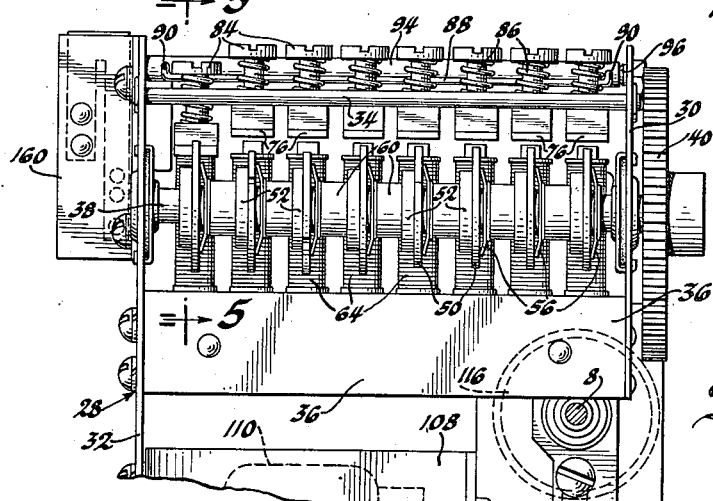
Figure 7 is a front elevation of the index assembly.
Figure 8:
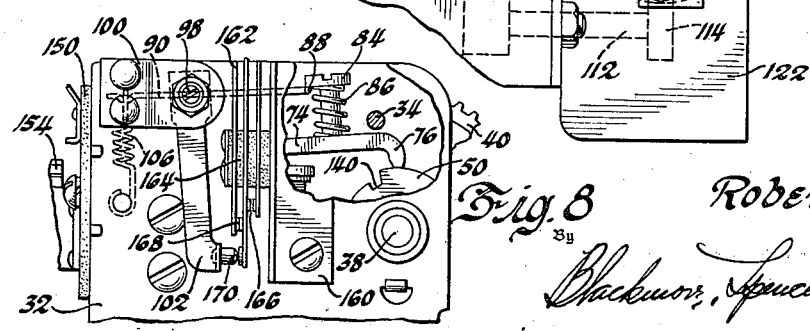
Figure 8 is an end view of the construction shown in Figure 7.
Figure 9:
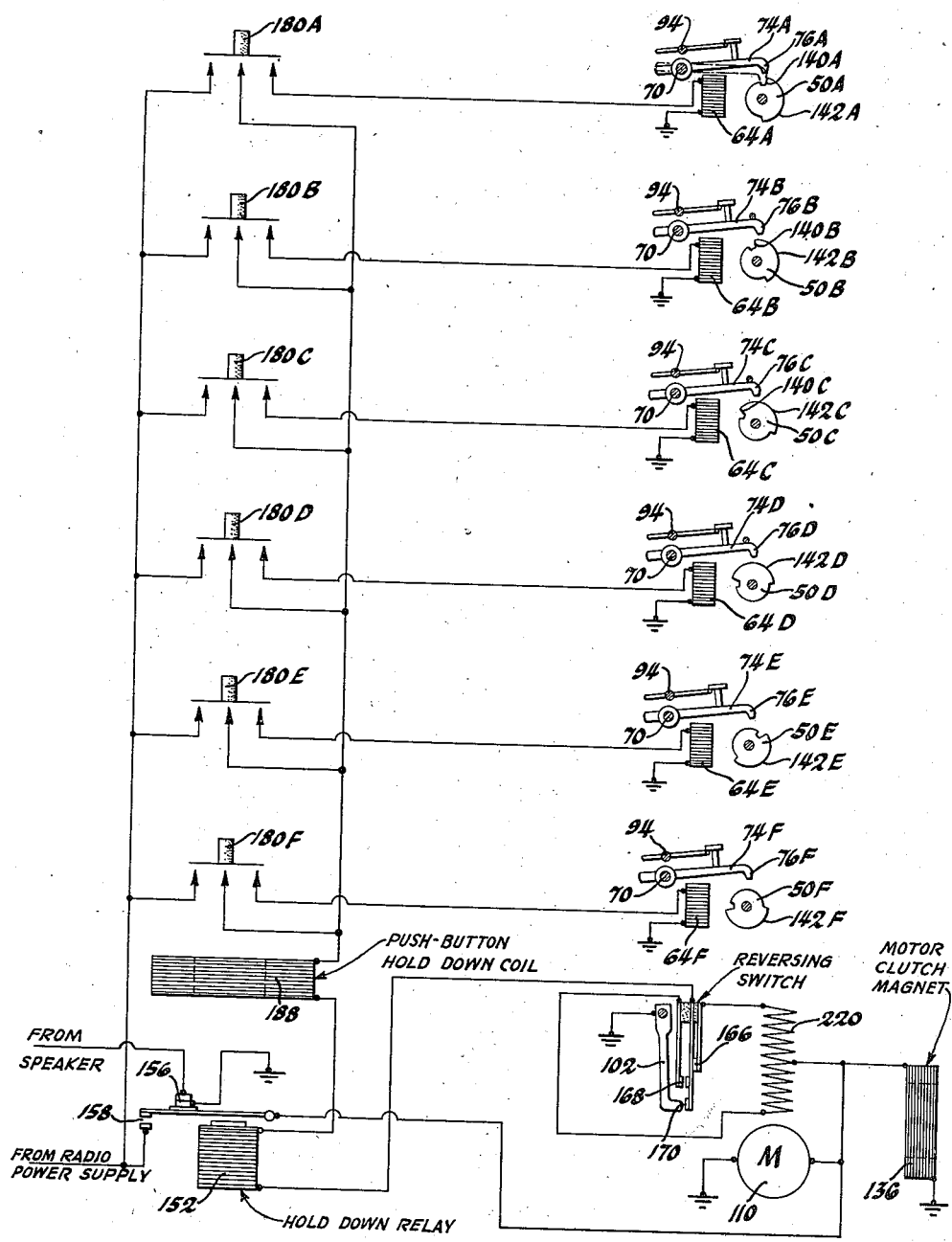
Figure 9 is a schematic wiring diagram of the system.

The indexing mechanism per se comprises an assembly which may be designated generally at 28 and is best shown in Figures 5 and 7. This assembly is designed to fit within the case 2 of the receiver and is connected to drive the tuning shaft having thereon the tuning condensers or other means, not shown, of varying the resonant frequency of the set. The sub-assembly 28 is formed of two end plates 30 and 32 having extending between them a spacing rod 34 which is rigidly secured to each. There is also secured between the two a panel 36 for supporting various pieces of the apparatus. Extending between the two end panels and rotatably journalled therein is a shaft 38, one end of which, namely, the right-hand end as shown in Figure 7, extends through the end plate 30 and has secured thereto a gear wheel 40 which is adapted to mesh with a suitable gear 42 on a parallel shaft 44.

The shaft 44 is journalled in the main housing 2 and carries thereon at a slightly spaced distance from the gear wheel 42 a smaller gear 46 which is adapted to mesh with a gear 48 driven by the rotating Bowden wire within the hollow cable 8 which, of course, is driven initially by the manually tuned knob 14 on the housing 10. Mounted on the shaft 38 are a plurality of cam discs 50, each cam disc being mounted directly on a flanged ring 52, one side of the flanged ring having an indenture cut therein within which a dished spring washer 56 is snapped and when in place tends to force the cam 50 against the shoulder of the flange to maintain it in place. These cams are roughly of two different semi-circular radii, which may be best seen in Figure 5, with a notch such as 140 at one index position; otherwise, the outer surface is either a large radius such as 142 or a substantially reduced radius such as 144.

Each of these flanged rings 52 upon which each cam is mounted has its inner circular surface corrugated, as is the outer surface of the shaft 48, so that it will turn therewith and not slip. There are provided between each of the rings 52 spacer sleeves 60 for locating the cams in their correct position. In this way it will be seen that there is provided a drive which will cause any one of the cams 50 to normally turn with the shaft, but which, under certain circumstances, will allow relative movement between the two, inasmuch as the cam 50 may slide upon its ring 52. Any number of these cams may be provided, the number depending entirely upon the number of different angular positions at which it is desired to stop the shaft. In this particular example eight of these cams are so provided.

Mounted upon the flanged upper surface 62 of the cross member 38' are a plurality of magnetic coils 64, one located in axial alignment with each of the cams 50. The cross member 62 is also bent up to form a backing support 66 in which is provided a plurality of vertical slots 68, the upper portion of this plate being curved to form a substantially semi-circular groove. Extending across the assembly at this point there is provided a shaft 70 which is parallel to the shaft 38 upon which are mounted a plurality of circular spaced sleeves 72, the outer surfaces of which are adapted to fit within the semi-circular portion of the extension 66, and attached to each of these sleeves is a forwardly extending arm 74, the end of which is bent downwardly to form a tip 76 cooperating with the cam surfaces of the cams 50. Also extending from a diametrically opposite point of each sleeve 72 is a short arm 78 which extends back through a slot 68 and has its extremity connected to a tension spring 80, the opposite end of which is connected to a projection 82 extending outwardly from the member 66. It will thus be evident that each of these arms 74 is spring-biased counterclockwise, as shown in Figure 5, or toward its upper position away from contact with its cam 50.

In each arm 74 toward the front portion thereof there is screw-threaded into the top surface a short stud 84 having therearound a coil spring 86. These studs 84 are in alignment with each other across the width of the assembly and maintain under the heads thereof and adjacent the coil springs a small transverse rod 88, the ends of which are bent at right angles therewith and proceed back on either side of the assembly to form arms 90, said arms being supported in holes through opposite ends of a cross rod 94, the ends of which are journalled on pointed adjustable pins 96 and 98. The adjustable pin 96 is located in the right-hand frame member 30, but the adjustable pin 98 is supported on an angular bracket 100 extending from the side frame 32 so that the end of the shaft 94 projects through the frame 92 a short distance before it is supported on the journalling pin.

There is rigidly clamped to this extension of the shaft 94 a short switching arm 102 for operating a switch mechanism later to be described. The one end of the rearwardly extending arm 90 has supported thereon a counter-balanced weight 104 to assist in raising the armature, the opposite arm on the other side of the shaft being secured to a short coil spring 106 for the same purpose. It will thus be evident that when any of the arms 74 are attracted by the associated relay 64 the cam follower 76 will be pulled toward the cam surface 50 and at the same time the small cross shaft 88 will be pulled downwardly, operating the switch arm 102. Of course the amount of depression will depend upon the location of the cam 50 which will depend upon its initial setting. It might also be pointed out at this time that the cross arm acts as a stop for all the arms 74 in their retracted position since they are spring-biased upwardly.

Figure 6:
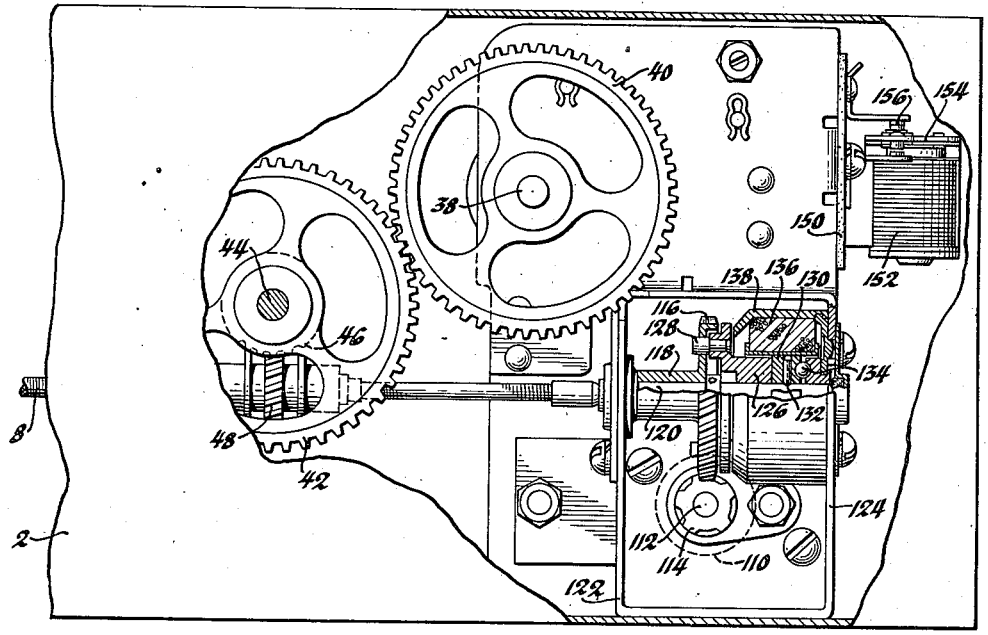
Figure 6 is a side elevation of the receiver case within which the index assembly is located, parts being broken away and shown in section.

Supported on a suitable bracket 108 below the bracket 36 is a small driving motor 110, shown in dotted lines in Figure 7. This driving motor through its shaft 112 drives a small worm wheel 114 which engages a gear wheel 116, said gear wheel having a long hub 118 rotatably mounted on a stub shaft 120, said shaft 120 being journalled in a small frame, the two portions 122 and 124 of which both extend upwardly from the housing 2. Mounted adjacent the gear 116 and also rotatable with respect to the shaft 120 is a second angular plate 126 having pins 128 therein which project into and cause it to rotate with the gear 116. Mounted on the shaft 120 there is next provided a small ring 130 secured to the shaft by a pin 132 and bearing axially against a ring of roller bearings 134. Around the stationary ring 130 and around a portion of the angular ring 126 is a magnetic coil 136 supported on the side of the frame 124 within a suitable housing 138. This whole mechanism, of course, operates as a clutch and when the coil 136 is energized the angular ring 126 is attracted toward the right, as shown in Figure 6, and engages with a heavy frictional force against the ring 130 and so causes the shaft 120 to rotate with the gear 116. When the coil 136 is deenergized, the gear 116 and its associated ring 126 may operate independently of the shaft. To the shaft 120 there is rigidly connected the end of a suitable driving shaft extending through to a gear 48 and the manual control knob 14.

Also supported on the end member 32 is an angled bracket 160 upon which is mounted a plurality of flexible switch members 162 carried on an insulating pin 164 and comprising switches 166 and 168, one terminal of each of these switches being common and carrying an extension arm 170, the end of which is adapted to contact with the end of arm 102 operated by movement of the rod 88 to cause certain desired switching, later to be described.

The remotely positioned control panel or box, designated generally at 172, comprises a substantially rectangular casing 174, one end of which is open and has an insulating closure member 176 supported thereon. The front portion of the casing 174 is provided with a plurality of openings 178 through which a series of push buttons 180 may project. Within the housing and supported upon the insulated base by a series of long threaded bolts 182 and spacing sleeves 184 is a panel 186 substantially parallel with the top and base of the casing. Carried upon this panel 186 is a circular magnetic hold coil 188 and secured over and enclosing the opposite side is an angular flanged ring 190. The base 186 has an upturned flanged edge 192 which surrounds the outer edge of the housing within which the magnetic coil 188 is clamped.

The top of the angled bracket 190 is also provided with a series of openings in alignment with openings 178 in the housing and the base 186 is provided with further aligned openings such as 194. Secured to each push button 180 is a shaft 196 which extends down and has secured to its lower end a reduced portion 198 which is journalled in an opening in the insulating base 176. The push button assembly is thus supported by the top and bottom plates. Secured to the shaft 196 is an insulated sleeve member 200 which carries on its outer surface a contact member 204 in the nature of a band for closing certain desired switch contacts. Secured to the insulating base adjacent each opening through which a rod 198 projects are a pair of spaced spring contacts, such as 206, between which the rod is movable, and as the same is moved up or down either an insulating portion 200 or the circular contacting ring 204 is placed between the switch members 206 to complete or break the electrical circuit therethrough.

Just below each push button there is a circular ring or band 208 on the shaft 196 which is rigidly secured thereto and acts as an armature for the magnet coil 188 in such a way that when the push button is depressed and the desired electrical circuit closed the magnet 188 is also placed in circuit as will be later described and its magnetic field maintains the push button in its depressed position until the set has reached its predetermined condition. The construction of all of the push buttons is, of course, identical with any one described, and there is also secured in the central portion of the magnet a suitable light source 210 which glows out through a circular opening 211. To the base there are also secured a number of contact bars or rings 212—214 for conducting current to the necessary points.

Referring now specifically to Figure 13 which shows a circuit diagram of my invention, there is seen a number of push buttons 180A—F which close the necessary switches and also a plurality of relay coils 64A—F, said relay coils of course operating their flanged armatures 74A—F and cooperating with their cams 50A—F. There is also shown the push button hold-down coil 188 and the hold-down relay 152 which operates two switches 156 and 158, the first of which is in the speaker line and acts to cut off the speaker from any energization, or mutes the same, and the second operates as a hold-in for power supply until the device has reached the end of its tuning cycle, which relay is shown in Figure 6. There are also shown switches 168 and 166 operated by the arm 102 which is turned by the spring rod 88 which extends across under the heads of the various bolts on the armature 74. There is also shown in this circuit diagram a motor clutch magnet 136 and the motor 110.

In their normal desired deenergized condition all of the switches of the 180 series will be open, switch 156 will be closed, switch 158 open, the magnetic clutch will be deenergized, switch 166 will be closed, switch 168 will be open and the magnet 188 will be deenergized. Now let us suppose it is desired to tune in the station to which the knob 189B is set to operate the control, 189B is therefore depressed and its attendant relay 64B is energized to attract its armature 74B, the tip 76B of which now descends to the cam surface 142B and in so turning rotates the arm 102 only a comparatively short distance so that the switch 166 is still closed and thus causes the energization of the upper half of the field coil 220 and causes the motor to rotate in the shortest direction until the tip 76B will fall into the notch 140B. When the switch 180B is closed to energize magnet 64B, an obvious circuit is completed to the push button hold-down coil 188 and to the hold-down relay 152 and switch 170 to ground. The closure of the push button hold-down coil maintains that particular push button in its down or closed position until the circuit is deenergized and so it is not necessary for the operator to continue to press on this button. The energization of the hold-down relay 152 opens the speaker circuit and closes the power supply to the motor 110 through the obvious circuit so that the motor is energized and the motor clutch magnet connects the motor shaft with the tuning shaft so that the same will be turned to tune the set and index the control camshaft.

As the camshaft is rotated to a point which will allow the tip 76B to enter the depression 140B, the arm 102 will be moved to such an extent that the circuit through the field will be broken by removing the ground from switch 170, thus deenergizing the motor and the hold circuit. It should be noted that the particular tip 76B involved may contact either the surface 144 having the smaller radius of its attendant cam or the surface 142 having the greater radius when it is attracted by the contact, and the distance that the armature 74 is allowed to move determines the direction of rotation of the motor through control of switches 166 and 168. If one is closed the motor will rotate in one direction, and if the other, the motor will rotate in the opposite direction. When the tip 76 drops into a notch 140, then the arm 102 does not contact the center member 170 which moves away therefrom and breaks the circuit to the ground to stop the mechanism. The same procedure would of course be identical if any of the other switches were depressed to tune in other pre-set stations, depending upon the position of the cams 50 which cooperate therewith.

I claim:

1. In a control device, a shaft to be indexed, means for driving said shaft, control means connected to said shaft comprising a plurality of adjustable cams, followers for said cams, remotely positioned control switching means for the driving means, hold-in means for the latter and switching means operated by the followers for actuating the hold-in means for the remote switches.

2. In a control device, a shaft to be indexed, means for driving said shaft, a control shaft connected thereto, a plurality of cams adjustably mounted on said control shaft, followers for said cams, switching means cotnrolling said driving means operated by said followers, remotely positioned control means for said driving means and further switches actuated by said followers for maintaining said remote means in its actuated position.

3. In a control device, a shaft to be indexed, at least one adjustable cam operatively connected thereto, a follower for the cam spring-biased away from the surface, magnetic means for urging the follower into engagement with the cam, means for driving the shaft, remote switching means controlling the driving means and the magnetic means, means for holding the remote switching means in its actuated position and switching means operated by follower movement to control the driving means for the shaft and also the holding means for the remote switching means whereby the same will remain in its actuated position until the mechanism has reached the desired index point.

4. In a control device, a shaft to be indexed, a control shaft connected thereto, means to drive the shafts, a plurality of cams frictionally mounted in axially spaced relation on the control shaft, a plurality of pivoted followers for the cams, spring-biasing means for maintaining the followers out of contact with the cams, magnetic means for moving the followers into contact with the cams, means operated by movement of any of the followers to control the driving means, remotely positioned means controlling the magnetic means and further magnetic means to lock the remotely positioned means in actuated position until a circuit is broken by the cam-operated means.

5. In a control device, a shaft, adjustable cam means mounted on said shaft, follower means for said cams, driving means for said shaft, remotely positioned means for urging said followers toward said cams and switching means operated by said follower movement to control both the driving means and the position of the remote means.

6. In a control device for indexing a shaft, driving means connected to said shaft, cam-operated switching means controling said driving means, remote means for controlling said cam-operated switches and hold means at the remote means operated by further cam-operated switches whereby once the remote means has been actuated it will remain in engagement until the device has completed its index cycle.

7. In a control device, a shaft to be indexed, a plurality of adjustable cams operatively connected to the shaft, a plurality of followers cooperating with said cams, switching means actuated by said followers, driving means for said shaft controlled by said switching means, spring-biasing means to urge the followers away from their associated cam surfaces, magnetic means to overcome the spring bias and maintain the followers in contact with the cams, remotely positioned switching means controlling the magnetic means, further magnetic means at the remotely positioned means to maintain each operated switch in its closed position when energized and additional switching means operated by the follower means controling said further magnetic means.

ROBERT H. HILL.